United States Patent [19]
Walton et al.

[11] Patent Number: 5,012,516
[45] Date of Patent: Apr. 30, 1991

[54] SWITCHING CIRCUITRY

[75] Inventors: David W. Walton, Otley; Roger Harrison, Halifax, both of England

[73] Assignee: Ferguson Limited, Enfield, United Kingdom

[21] Appl. No.: 438,472

[22] PCT Filed: Apr. 26, 1989

[86] PCT No.: PCT/GB89/00443
§ 371 Date: Feb. 27, 1990
§ 102(e) Date: Feb. 27, 1990

[87] PCT Pub. No.: WO89/10671
PCT Pub. Date: Nov. 2, 1989

[30] Foreign Application Priority Data
Apr. 28, 1988 [GB] United Kingdom ............... 8810048

[51] Int. Cl.5 .................................. H04H 5/00
[52] U.S. Cl. ....................................... 381/3
[58] Field of Search ...................... 381/2, 3, 4, 13

[56] References Cited
U.S. PATENT DOCUMENTS

| | | | |
|---|---|---|---|
| 3,991,374 | 11/1976 | Csicsatka et al. | 381/4 |
| 4,030,036 | 6/1977 | Kusano | 381/4 |
| 4,302,837 | 11/1981 | Tanaka et al. | 381/3 |
| 4,761,814 | 8/1988 | Sugai et al. | 381/13 |

Primary Examiner—Forester W. Isen
Attorney, Agent, or Firm—Fleit, Jacobson, Cohn, Price, Holman & Stern

[57] ABSTRACT

Automatic switching circuitry for processing input signals of more than one frequency, incorporating information for the derivation of one or more audio channels. The circuitry, including a selectively variable bandpass device, may be one of several values corresponding to the frequency of a input signal. A demultiplexing device is provided to apply a demultiplexing operation on signals output from the bandpass device, with a control logic monitoring the demultiplexing device to determine if a demultiplexing operation has been achieved, and instructing the selection of another value for the bandpass device if no demultiplexing operation was achieved for a given value of the bandpass device.

4 Claims, 3 Drawing Sheets

SWITCHING CIRCUITRY

The present invention relates to automatic switching circuitry, particularly but not solely for use in multi-standard television equipment relating to multi-channel audio accompanying conventional television format signals.

There are many television systems in general use throughout the world. In each of these systems, video signals including colour information are modulated on a vision carrier and sound signals are modulated on a sound carrier whose frequency differs from the vision carrier by an amount which depends on the television system and on the local standard of the system. Also, more systems transmit FM sound signals, although one SECAM system transmits AM sound.

With the systems and standards presently in use the spacing between the vision and sound carriers is 4.5 MHz, 5.5 MHz, 6.0 MHz or 6.5 MHz depending on the television system and standard. Also, spacings of 5.7 MHz and 6.2 MHz are coming into use for stereo TV sound. This frequency spacing is preserved during conversion to the intermediate frequency (IF) in a television receiver, and is converted to the sound intercarrier by balanced demodulation of the sound IF signal by the vision carrier signal filtered from the vision IF signal. Thus, the carrier frequency of the sound intercarrier signal supplied to the sound demodulator has one of the values mentioned above.

In conventional television receivers, the sound IF stages and the sound demodulator contain filters and tuned circuits whose resonant frequencies are adapted to the system and standard for which the receiver is designed. Also, the vision IF stages contain resonant traps for preventing sound-on-vision interference, and the resonant frequencies of these traps are similarly adapted to the system and standard in use.

GB 2124060A (SPT Video) discloses a circuit arrangement to provide automatic selection of television sound frequency, such as sound intercarrier frequency, in a television receiver for receiving television signals of different systems or standards. The arrangement comprises a plurality of band pass filters tuned to the different sound intercarrier frequencies. The levels of the outputs of the filters are determined by level detecting means and supplied to a circuit arrangement for detecting the highest level of the detected signals. Selection controlling means then selects the frequency of the highest level and drives the sound demodulator of the television set.

A proposed transmission system for stereo signals to accompany conventional television transmissions, known as NICAM, provides a serial data stream partitioned into 728-bit frames, each transmitted in a millisecond. Each frame has: a first section of eight bits comprising a Frame Alignment Word (FAW) which marks the start of the frame; a second section of five bits which provide control information, being one flag bit (namely $C_0$, which alternates between 0 and 1 every 8 milliseconds to determine odd and even frames over a 16 frame sequence) and four mode bits (namely $C_1$, $C_2$, $C_3$ and $C_4$, which indicate the nature of the transmitted signal, e.g. mono, stereo, dual-language, data); a third section of eleven bits of additional data, independent of the control information bits; and finally a fourth section of sixty-four 11-bit words corresponding to the audio (or data if appropriate) being transmitted, this last section having a total of 704 bits.

In each frame as transmitted, interleaving is applied to the block of 720 bits which follow the FAW in order to ensure that adjacent bits are not transmitted sequentially so as to minimise the effect of multiple-bit errors. The interleaving pattern places data bits, which are adjacent in the frame structure as output by the television receiver, in positions at least 16 clock periods apart in the transmitted bit stream (i.e. at least 15 other bits occur between bits which are adjacent in the output frame structure).

In the production of the sound signals, they are sampled at 32 kHz and coded initially with a resolution of 14 bits per sample. For transmission, the number of bits per sample is reduced to 10, using near-instantaneous companding, and one parity bit is added to the end of each 10-bit sample word for error detection and scale-factor signalling purposes, thereby resulting in the 11-bit words in the fourth section of the frame. At the receiver, the transmitted signals are demultiplexed to produce an audio output.

An object of the present invention is to provide automatic switching circuitry for multi-standard television equipment so that the equipment is capable of receiving NICAM signals of more than one sound intermediate frequency.

The present invention provides automatic switching circuitry comprising means to process an input signal incorporating information for the derivation of one or more audio channels, the processing means comprising:
   selectively variable bandpass means,
   means to apply a demultiplex operation on signals output from the bandpass means;
   means to monitor the demultiplex means to determine if a demultiplex operation has been achieved;
   and means to instruct selection of another value for the bandpass means if no demultiplex operation was achieved for a given value of the bandpass means.

The present invention allows for transmission of NICAM signals at more than one sound intermediate frequency (SIF). The inventors have appreciated that known automatic switching circuitry for multi-standard television equipment is not suitable for selecting between SIFs used for NICAM. In the circuit arrangement disclosed in GB 2124060A, for example, processing of the input signals to determine the SIF to be received by the sound demodulator takes place before the signals are demodulated. In contrast, the present invention provides for selection of a value for the bandpass means, and hence the SIF to be received, after the input signal is demultiplexed. Because of the nature of NICAM it is only after the input signal at a particular SIF has been demultiplexed that it can be determined whether or not NICAM signals are being transmitted on that particular SIF.

The monitoring means has a first output signal if a demultiplex operation is achieved and a second output signal if a demultiplex operation is not achieved and so preferably the monitoring means includes means to delay production of said second output signal for a time period so that said second output signal is produced if no demultiplex operation was achieved over a said time period. This reduces the risk of the automatic switching circuitry switching away from a particular value of the bandpass means if there is an instantaneous interruption in the transmission of a signal.

Preferably the instructing means includes means to latch the bandpass means at a particular value if a demultiplex operation is achieved for said particular value.

The present invention also embodies equipment with the automatic switching circuitry as defined herein, and includes equipment for use in a television receiver or a video recording and/or play-back machine, and/or for use in devices associated with the transmission and/or reception of television signals.

In order that the invention may more readily be understood, a description is now given, by way of example only, reference being made to the accompanying drawings, in which.

Figure 1:
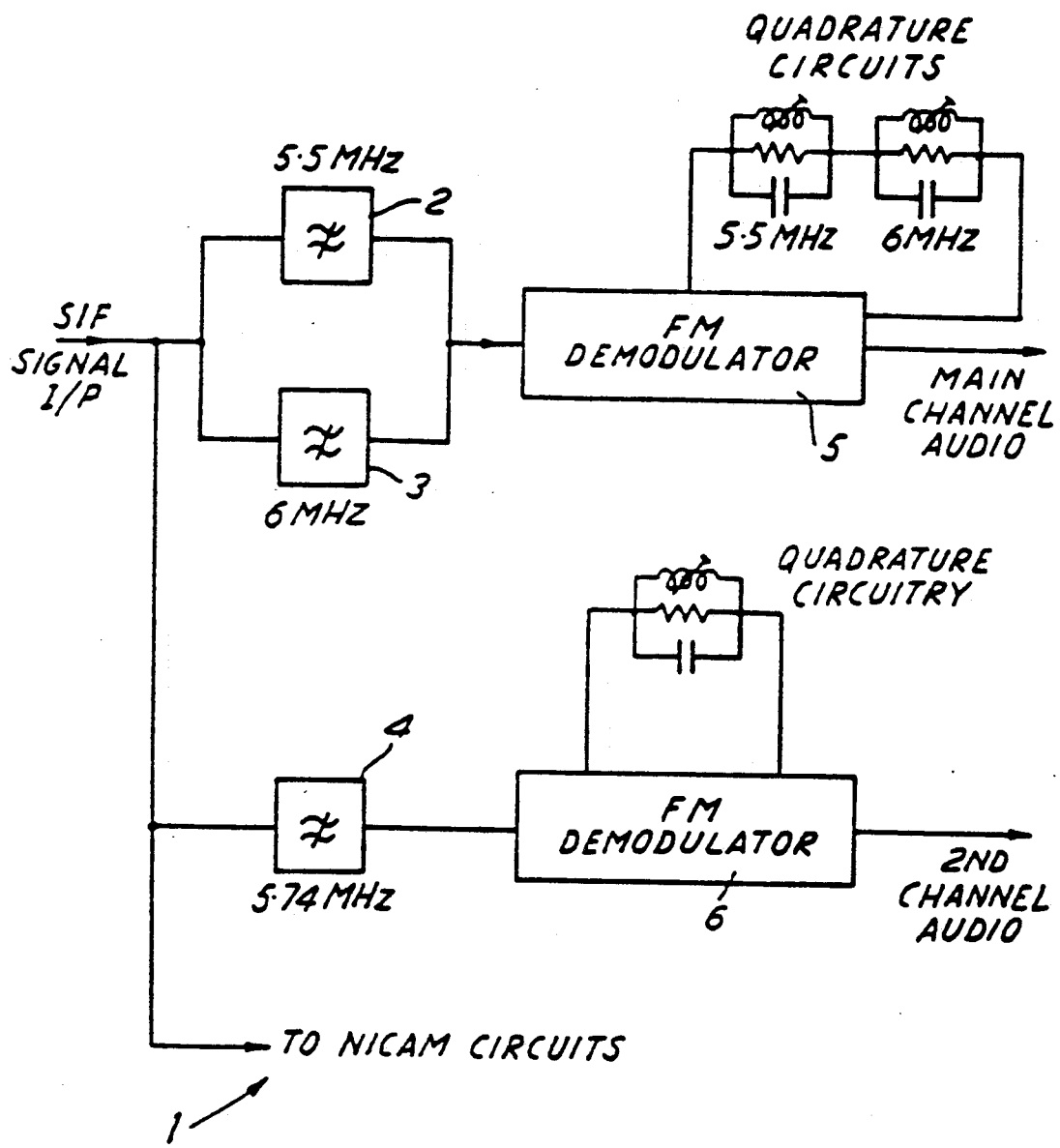
FIG. 1 is a schematic diagram of a part of a television chassis embodying the present invention.

FIG. 1 shows the FM television sound demodulator circuitry which is used in an existing television receiver chassis and further incorporates stereo signal processing circuits 1 for processing NICAM signals. The sound demodulator circuitry is multi-standard and so will process a main audio channel carrier of 5.74 MBz to provide stereo sound can also be processed. To this effect, the circuitry has three input ceramic filters 2, 3, 4 which are in parallel. An FM demodulator 5 double-tuned to 5.5 MHz and 6 MHz for the main audio carrier is connected to the first and second input ceramic filters 2, 3 which respectively pass signals of carrier frequences 5.5 MHz and 6 MHz. The first and second filters 2,3 are not switched. A second FM demodulator 6 tuned to 5.74 MHz for the second audio channel carrier is connected to the third input ceramic filter 4 which passes signals of carrier frequency 5.74 MHz.

A SIF signal input to the sound demodulator circuitry is also input to stereo signal processing circuits 1 for processing NICAM signals. A conventional single standard system for processing NICAM signals has a QPSK decoder, a demultiplexer, a SIF filter and a decoding oscillator crystal at a frequency dependent on the single standard for which the circuit is to be used.

As indicated hereinbefore, NICAM signals comprise digital data. They can be transmitted by varying the phase of a sinusoidal carrier wave, a process termed phase-shift keying (PSK). Quadrature phase-shift keying (QPSK) uses the four phase values 45°, 135°, 225° and 315°. A QPSK decoder decodes the carrier wave to generate the digital data of which the signal is comprised. The data so produced is then demultiplexed to produce the audio output.

Figure 2:
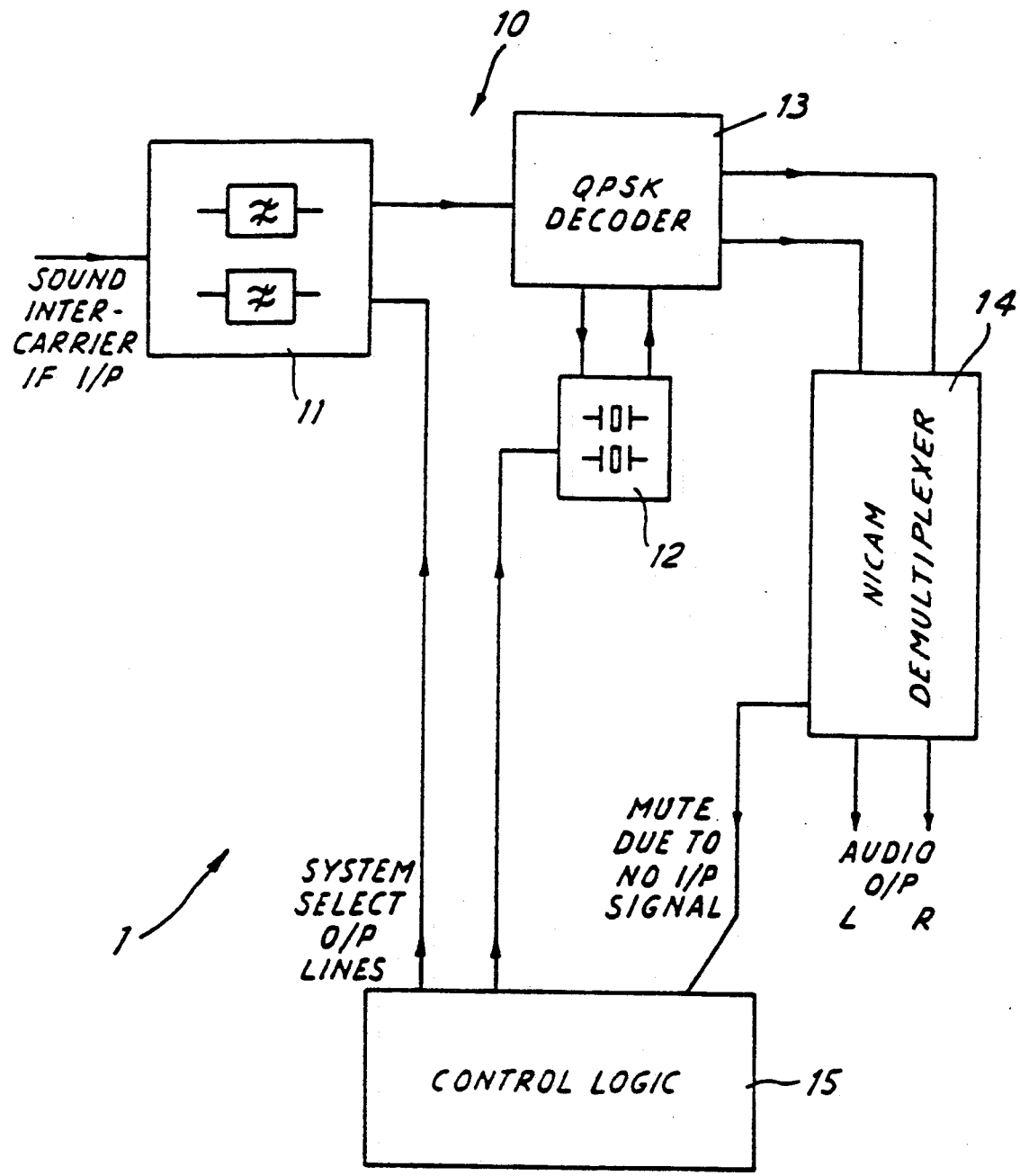
FIG. 2 is a schematic diagram of automatic switching circuitry embodying the present invention.

FIG. 2 shows the automatic switching circuitry 1 embodying the present invention for processing NICAM signals which operates independent of the FM television sound demodulator operations of FIG. 1. The SIF signal is input to a set 10 of switchable input bandpass filters, shown in FIG. 2 as comprising first and second input filters 11 and respective first and second decoding oscillator crystals 12 in switching network. The output from a QPSK decoder 13 is input to a NICAM demultiplexer 14. At present NICAM signals may be carried on one of two SIF, 5.85 MHz or 6.55 MHz. In order for an audio output signal to be produced, the filter 11 and decoding oscillator crystal 12 corresponding to the SIF of the input signal must be selected so that the signal can be passed, decoded and so demultiplexed.

If the filter 11 and decoding oscillator crystal 12 of incorrect value are selected, there is no appropriate input signal to the demultiplexer 14 and so no demultiplex operation can be achieved. No audio output signal is then produced, the demultiplexer 14 being in MUTED mode, i.e. producing a MUTE output signal. Control logic 15 senses the MUTE signal and selects an input filter 11 and decoding oscillator crystal 12 of another value. The input filters 11 and decoding oscillator crystals 12 are thus switched between various values until that filter and crystal of value corresponding to the SIF of the input signal are selected. The selection of an appropriate value depends therefore on the QPSK decoder 14 actually locking to a valid signal, the NICAM demultiplexer then UNMUTING, i.e. the processing being done after the demultiplexing of the data.

Figure 3:
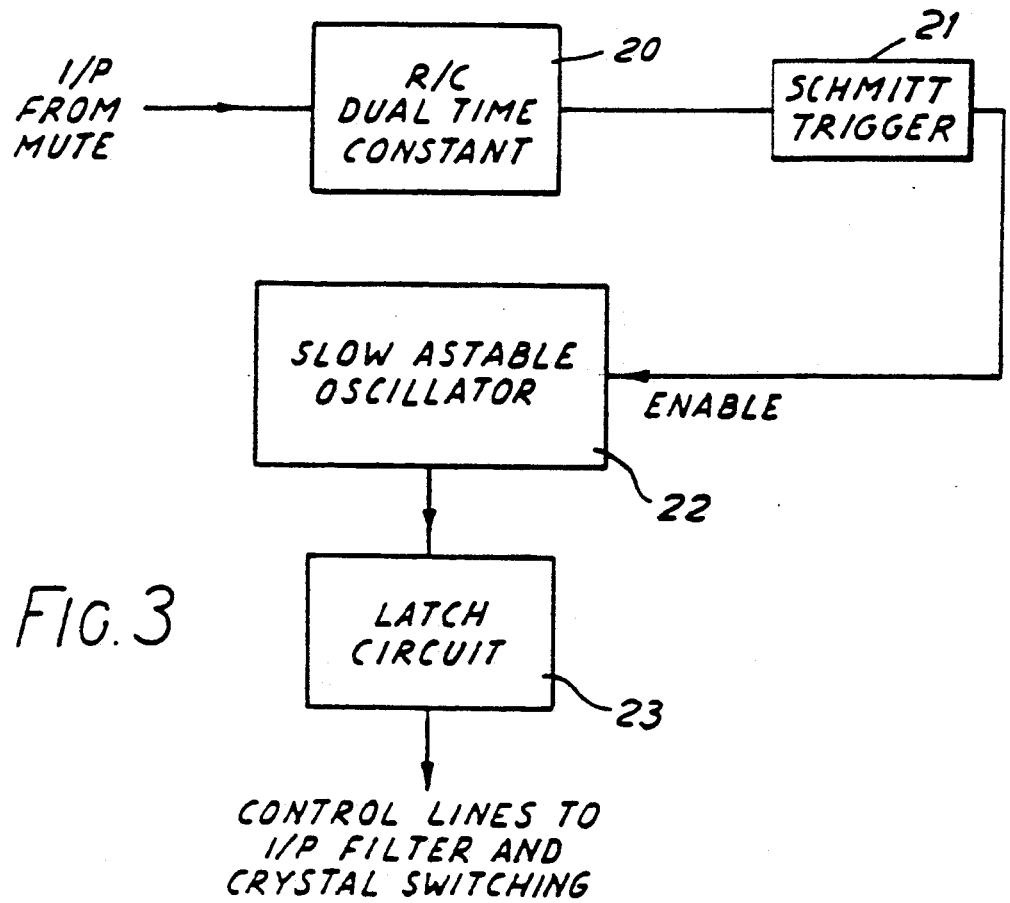
FIG. 3 is a schematic diagram of part of the circuit of FIG. 2.

The control logic 15 to implement selection of the correct input filter and a crystal utilises a sensing circuit with two stages (see FIG. 3). The first stage monitors the demultiplexer 14 to determine if a demultiplex operation has been achieved and includes a dual rate time constant unit 20 and a Schmitt trigger 21. The dual rate time constant unit 20 is driven from the mute output of the demultiplexer 14, thereby allowing rapid charging (unmute) but slow discharge (muting) of the time constant reservoir. This level is sensed in the Schmitt trigger circuit 21 to give a consistent digital output unaffected by short mutes and interruptions. The first stage of the control logic 15 accordingly delays production of a signal indicating that no demultiplex operation was achieved for a time period dependent on the rate of discharge of the unit 20 and prevents dropout due to instantaneous short mutes.

In the second stage, the control signals for the input filter and oscillator are derived by an astable oscillator 22 running at a very slow rate (slower than the maximum predicted pull-in time) and enabled in the 'mute' mode, i.e. when the first stage of the control logic 15, produces a signal indicating that no demultiplex operation has been achieved, to switch alternately between the two standards and stopped when the signal is fully locked (represented by an unmuted signal). A latch 23 holds this value for long enough to confirm this state, until the demultiplexer again is muted for longer than the aforementioned time period.

Figure 4:
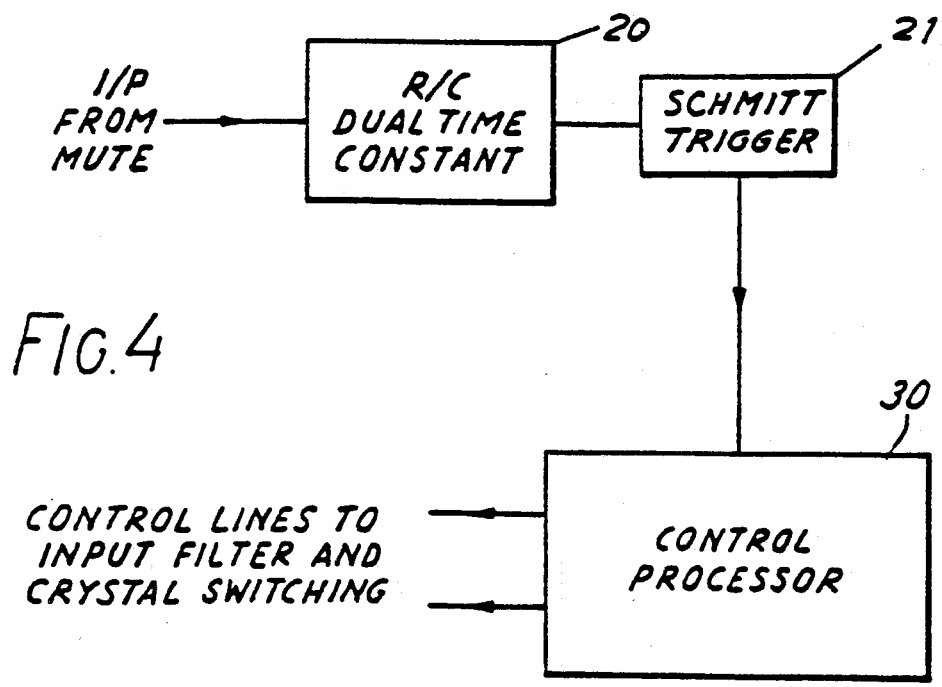
FIG. 4 is a schematic diagram of an alternative arrangement to that shown in FIG. 3.

FIG. 4 shows another arrangement of control logic 15 wherein the second stage is implemented by a microprocessor 30 which is used to sense the state of the mute line, either polled or by interrupt, and carry out the search oscillator and latch function. The microprocessor can also be used to store the default value of standard for any programme thus potentially reducing the lock-up time of the system at programme change. Storage of the individual channel status can make switching instantaneous and automatic.

The function of the dual time constant could also be carried out in software in the microprocessor if desired.

We claim:

1. Automatic switching circuitry for use in receiving NICAM signals, comprising:
   filter means for receiving NICAM signals and passing signals of a certain band;
   a quadrature phase shift key decoder coupled to receive signals passed by said filter means and for producing a decoded NICAM signal;

oscillator means for generation of a plurality of signals of different frequencies coupled to said quadrature phase shift key decoder;

a demultiplexer means receiving the decoded NICAM output signals of the quadrature phase shift key decoder for generating a mute signal responsive to no output signal from the quadrature phase shift key decoder and for generating an audio output signal responsive thereto; and control logic means responsive to sensing a mute signal generated by said demultiplexer means for switching said filter means and oscillator means between various values until the quadrature phase shift key decoder produces a decoded NICAM output signal.

2. Automatic switching circuitry according to claim 1 wherein said control logic means comprises:

monitoring means for monitoring the output of said demultiplexer means for determining the existence of a muting signal for a predetermined time; and astable oscillator means for effecting the switching of said filter means and said oscillator means responsive to the duration of the muting signal being longer than said predetermined time.

3. Automatic switching circuitry according to claim 2 wherein said control logic means further includes latching means for latching the filter means at a particular value if the quadrature phase shift key decoder produces a decoded NICAM output signal.

4. Automatic switching circuitry according to claim 3 wherein the control logic means forms part of a microprocessor, the microprocessor further comprising means to store a default value for the bandpass means, the default value being for a specific program.

* * * * *